Patented Mar. 8, 1932

1,848,416

UNITED STATES PATENT OFFICE

EDWARD EISENHAUER, JR., OF LOS ANGELES, CALIFORNIA, ASSIGNOR OF ONE-HALF TO CHARLES A. PALMER, OF LOS ANGELES, CALIFORNIA

EXTRACTION OF COPPER FROM ORES

No Drawing.     Application filed June 16, 1930. Serial No. 461,634.

This invention relates to a process, and the reagents used therein, for extracting copper by leaching, from ores of the class described as oxidized and silicate ores, which carry the copper in the form of oxides, silicates, carbonates, or combinations of the same. The principal object of the invention is to provide a process of this character which will enable a high recovery to be economically made so that comparatively low grade copper ores can be treated at a profit.

Heretofore, it has been impossible to profitably work certain classes of copper silicate-carbonate-oxide ores economically owing to the waste of expensive solvent reagents due to the presence of acid consuming constituents other than the copper. In the present invention, however, two stages are employed. In the first stage the carbonate of lime and other valueless acid consuming constituents are neutralized together with part of the copper by a relatively cheap acid and a second acid solvent is then added which need only dissolve the remainder of the copper content, which is chiefly in the form of silicate.

Numerous tests have been made up to the present time, substantially all of which show an extraction of from 90 to 95% on ore of the above described nature.

As an example an ore of the following content was treated:

| | Per cent |
|---|---|
| Copper | 8.60 |
| Calcium carbonate | 2.40 |

The copper was carried as silicates 40, as carbonates 60.

Treating the above ore by the present process a recovery of 93.8% was obtained with a very low acid consumption.

The acids employed in the process are sulphuric and hydrochloric, (or muriatic). The unusual results obtained, however, are not inherent in the acids, per se, but are believed to result from the method of use and the method of combing the two acids in this process.

The process comprises the following steps:

1. Crushing. The ore is crushed to a mesh suitable to the particular ore being treated. In a class of ore as mentioned above 50 mesh has been found highly satisfactory.

2. First acid reagent. From 8 to 10% by weight sulphuric acid (density 1.84) is added to the ground ore with sufficient water to make an agitatable pulp.

3. First agitation. The pulp is slowly agitated in any suitable agitating mechanism to bring the particles into intimate contact with the reagent. This agitation is carried on for approximately two hours.

4. Second reagent. Approximately 5% by weight of hydrochloric acid (density 1.16 to 1.17) is now added to the pulp, treated as above.

5. Second agitation. The pulp with the second reagent is now slowly agitated for from 12 to 16 hours.

6. Third agitation. Water equal to the weight of the ore is now added to the pulp and the entire mass is agitated for an additional two hours.

7. Washing. The solution is drawn off and the residue is washed clean of copper solution.

Wash water from Step 7 is preferably returned to Step 6 on succeeding batch.

While the above has been described as separate and distinct steps it is desired to be understood that the agitation is continuous and the reagents and water added during this continuous agitation.

The copper is precipitated from the solution with scrap iron or by any of the common precipitating methods and is melted into bars in the form if cement copper. Bars produced by this method show a purity of from 98 to 99%.

The sulphuric acid because of its cheapness and is always used first and acts to neutralize the lime and other acid consuming constituents of the ore and carries practically all of the carbonates of copper into solution. This leaves the silicates of copper thoroughly cleaned and free so that when the hydrochloric acid is added, it, together with the remaining free sulphuric acid, will be able to immediatey act upon the silicates of copper so as to place the latter into solution.

The solution after the precipitation of the copper contains considerable ferrous iron. This may be oxidized in any desired manner over to the ferric state and the solution then forms a highly satisfactory solvent for the carbonates of copper and may be repeatedly used for the first reagent in Step 2 above, until it becomes too contaminated for further use. This results in a great saving of acid.

The production of basic ferric salts in the reactions indicated above is obvious to one skilled in the art. The solvent properties of these basic ferric salts is also well known, hence the re-use or return of solutions to succeeding batches will tend to materially diminish the amount of the acids indicated in the above outline of the process.

While preferred forms of the invention have been described in some detail, together with the theories which it is believed to best explain its success, it is to be understood that the invention is not limited to the precise procedure described nor is dependent upon the accuracy of the theories which have been advanced. On the contrary, the invention is not to be regarded as limited except in so far as such limitations are included within the terms of the accompanying claims, in which it is the intention to claim all novelty inherent in the invention as broadly as is permissible in view of the prior art.

Having thus described the invention what is claimed and desired secured by Letters Patent is:

1. A process for the extraction of copper from a copper carbonate, silicate ore comprising: treating said ore with sulphuric acid, agitating said treated ore until the carbonates are substantially dissolved, thence adding hydrochloric acid thereto; and further agitating said ore, said sulphuric acid and said hydrochloric acid until the silicates are substantially dissolved.

2. A process for the extraction of copper from carbonate, silicate ores comprising: first treating said ore with sulphuric acid to dissolve the carbonates, thence adding hydrochloric acid to the treated pulp to dissolve the silicates; drawing off the final acid solution; precipitating the copper therefrom with iron; returning the effluent acid solution from said precipitation to fresh ore as a solvent for the carbonates.

3. A process for treating ores carrying copper both as carbonates and as silicates comprising: first dissolving the carbonates from said ore with sulphuric acid; thence dissolving the remaining copper silicates with hydrochloric acid.

4. A process for treating ores carrying copper both as carbonates and as silicates comprising: neutralizing the lime with sulphuric acid; thence treating the residue with hydrochloric acid as a solvent for the copper silicates.

5. A process for recovering copper from ores carrying calcium carbonate, copper carbonate, copper silicate and copper oxide comprising: adding sulphuric acid to said ore; allowing a sufficient time to elapse for the substantial solution of the calcium and copper carbonates; thence adding hydrochloric acid for the dissolution of the remaining copper silicates and oxides.

In testimony whereof, I affix my signature.

EDWARD EISENHAUER, Jr.